Patented Apr. 24, 1951

2,550,173

UNITED STATES PATENT OFFICE 2,550,173

PROCESS FOR PURIFICATION OF CALCIUM FLUORIDE AND LITHIUM FLUORIDE AND MANUFACTURE OF MACROCRYSTALS THEREOF

Carl F. Swinehart, University Heights, Ohio, and Marie Early, Cambridge, Mass., assignors to The Harshaw Chemical Company, Cleveland, Ohio, a corporation of Ohio No Drawing. Application October 28, 1949, Serial No. 124,249

6 Claims. (Cl. 23—88)

This invention relates to production of optical macrocrystals of alkali and alkaline earth fluorides and more especially to ultrapurification of such materials.

It is likely that if such materials as are used for the preparation of optical quality crystals were absolutely pure, a great many difficulties which are now encountered would disappear. Absolute purity is, however, impossible; and the near approaches to it, such as are required for optical crystals, are beset with problems of a character altogether different from those encountered in less extreme purifications. Ordinary analytical methods show up many trace impurities but fail to detect all impurities which are deleterious. Materials used for the removal of impurities may introduce substances more deleterious than those they remove, and the presence of which may be unsuspected both in the reagent and in the product. Examination of the finished macrocrystals for multiplicity, light scattering, cloudiness and color is the only satisfactory means of evaluation of the purification process.

It may be that long continued efforts will yield analytical methods which show the presence of all significant impurities down to the required limit and that these will facilitate the selection of reagents appropriate to each impurity necessary to be removed. In the meantime, proceeding on an empirical basis, we have discovered that we are able to produce fluoride materials greatly improved for the purpose of crystal growing if we subject such materials in the solid, and preferably in the crystalline state to the action of elemental fluorine.

The materials which we may improve by such treatment are the fluorides of calcium and lithium. Sometimes the naturally occurring $CaF_2$ crystals have a coloration, thought to be of organic nature, which can be removed by fluorination and sometimes crystals which appear clear will assume color when melted and caused to solidify as a macrocrystal. After the removal of the first type of coloration by fluorination, it becomes possible to select good optical stock by visual examination for inclusions in the fluorinated pieces. Natural coloration can be removed by heating in air but material so treated is no longer fit for production of macrocrystals, tending to develop color on recrystallization. We find, also, that we are able to prevent the appearance of the second type of coloration by the fluorination procedure, that is the fluorinated material which would otherwise develop color during formation of the macrocrystal does not do so.

It is not necessary that these fluorides should be finely divided. We have treated crystals of a cubic inch volume and even larger and have found that the fluorine will penetrate to the center. For example, where the treatment decolorizes the crystal, the effect can be seen to proceed from the surface inwardly. The time can be reduced if the material is subdivided to say from 4 to 40 mesh, however, it may be found highly desirable to treat solid crystalline material in pieces of the order of from 0.002 cubic inch (⅛" diameter approx.) volume up to one cubic inch or even larger since the fluorination of crystals of that size which are discolored frequently will render a proportion of them colorless so that the so-treated pieces which are clear or merely contain white clouding or veils can be separated from those which are still discolored or contain specks or visible inclusions in the nature of particles of dirt or obviously foreign material. Milky appearing regions are herein described as cloudy. They are usually white or light gray or light brown or light yellow and have a milky appearance. If they appear to be two-dimensional they are called veils. This procedure enables us to use source material which would be otherwise very difficult or impossible to select. It is not always necessary to resort to this type of selection and frequently a lot of source materials can be sampled and its characteristics determined by the fluorination of the larger pieces, whereupon it may be obvious that the visual selection of fluorinated material will be unnecessary. It then becomes safe to pulverize that lot of material and treat it with fluorine in a state of fine subdivision, say 4 to 40 mesh, whereupon it may be used in the formation of macrocrystals.

The treatment of $CaF_2$ may be accomplished by placing it in trays, which may be of nickel, and exposing it to fluorine at a temperature of 200° C. to 1000° C., preferably from 300° C. to 500° C. for a period of time sufficient to complete the process. There does not appear to be any deleterious effect from long treatment. Accordingly, it is best to continue the fluorination for from 8 hours to a week, although a two-hour treatment is definitely beneficial. Lithium fluoride may be treated similarly, the maximum temperature preferably being about 450° C.

It is to be understood that the method is considered most appropriate for use on materials which are already fairly pure.

While it is not too clear what in chemical terms the effect is in any particular case, it may be that some conclusions may be drawn with reasonable certainty. For example, it appears likely that $SiO_2$ is removed in the form of $SiF_4$ and $O_2$ or $OF_2$. Chlorides probably are converted to fluorides allowing the chlorine to be liberated in gaseous form. Sulfides, oxides and carbonates, included or superficial due to exposure to the atmosphere, appear to be converted to fluorides, the metal fluoride remaining and sulfur, oxygen and carbon escaping in gaseous state probably mostly as $O_2$, $OF_2$, $CF_4$ or $SF_6$. Again, it is known that under certain conditions some fluorides will hydrolyze to some extent. The fluorine treatment is thought to be effective to reverse this process and to remove any traces of water, free or combined. Metal fluorides remain, but in trace quantities they can be tolerated. There appears to be important improvement in the physical characteristics also.

Another feature of the process is the fact that fluorine itself can be very pure as compared with other reagents, for example anhydrous HF. It is most difficult to obtain HF free from $SO_2$ or $H_2S$, but when HF containing traces of these impurities is electrolyzed in the fluorine cell, the impurities are partly lost by being evolved at the cathode and for the most part those evolved with the fluorine are such as fluorine is capable of removing from the fluoride being purified. Thus there is less chance to introduce impurities such as sulfur along with the reagent.

The material so treated according to the above described steps, as a second step, may be fused and allowed to solidify over a period of from 24 hours to 10 days by lowering the containing vessel from a compartment above the melting point of the material slowly to a compartment at a temperature therebelow. Substantial further purification results, partly in all probability from liberation at the higher temperature of gaseous or volatilizable materials formed during the first step and remaining occluded in the solid state. Preferably the recrystallization is carried out in a vacuum.

This second purification step may be performed as a preliminary to growing the macrocrystal, or the growing of the macrocrystal may actually constitute this second step. In either case, the essence of the second step, insofar as it is related to the fluorination step is the release by sedimentation in and crystallization from the molten state of occluded volatilizable materials formed by fluorination in the solid state. The fluorination treatment can be used in connection with and for augmentation of the effects of getter materials which may be used in the second step for removal of impurities, e. g. admixed plumbous fluoride with $CaF_2$. The getter materials are not essential to the production of improved crystals but they are helpful. For example, 0.05 to 0.2% of plumbous fluoride based upon the weight of $CaF_2$ may be used.

The following examples will serve to illustrate the invention:

*Example I*

About 20 pounds of fluorspar, in the form of crystals crushed to about 40 mesh which before crushing had been selected for clarity and freedom from color but which contained areas of slight visible white clouding were placed in nickel trays in an externally heated furnace and brought up to a temperature of 450° C. At this temperature $F_2$ was passed over the material for about 32 hours. The furnace was then swept free of $F_2$ by passing in dry nitrogen. A portion of the product was fused in a carbon crucible and, over a period of 3 days, was allowed to solidify in a vacuum into a single macrocrystal weighing about 4 lbs. using the process described above. There was no visible color or clouding and upon passing a narrow beam of light from a tungsten lamp through the crystal, the Tyndall effect was faint.

*Example II*

By varying the procedure of Example I to the extent of adding 0.1 per cent of plumbous fluoride based upon the weight of $CaF_2$ before fusion of the fluorinated material a further improvement was obtained in respect to light scattering to the extent that the Tyndall effect was fainter than before.

*Example III*

Following Example I with the exception that the fluorine treatment was omitted, and employing fluorspar from the same batch, a crystal was obtained which was too badly clouded to be satisfactory for optical purposes, which had a pink to lavender coloration and which exhibited a strong Tyndall effect. This coloration was not present before crystallization but developed in the crucible.

In selecting materials for making macrocrystals of calcium fluoride for optical purposes, the practice has been that operatives in the mining area would select relatively clear pieces (translucent if colored) which would be sold as optical grade spar. This material would be sorted over after crushing to pieces about 1 to 4 mesh, all pieces with visible dirty inclusions and dark specks being rejected but cloudy pieces being accepted. Then the material would be crushed to the order of $\frac{1}{16}$ to $\frac{1}{8}$ of an inch in smallest dimension and again sorted, this time, all cloudy pieces being rejected. This last laborious selection can be eliminated by the fluorination treatment without loss of optical quality. Indeed, the rejects from this last selection have been fluorinated as above described and have produced crystals of quality as high as the selected pieces without fluorination. It was not to be expected that cloudy material could be made suitable by treatment with fluorine. The surprising fact that the fluorinated material did not develop the pink to lavender coloration on recrystallization indicates that the fluorination treatment promotes a physical state which is of importance for optical purposes.

*Example IV*

Lithium fluoride treated in the same way as the calcium fluoride was treated in Example I yielded good optical quality crystal material, free from color, dark inclusions and clouding. This compound is produced by fluorination of a suitable lithium compound such as the carbonate nitrate or sulfate. The fluorinating agent may be HF for the carbonate, $NH_4F$ for the nitrate or fluorine for the sulfate and the product may then be treated with elemental fluorine. We have produced optically satisfactory macrocrystalline lithium fluoride in this manner.

*Example V*

Colored fluorspar (dark bluish color, somewhat translucent) was fluorinated with elemental fluorine for about 30 hours in pieces of large size from about a quarter inch to one inch pieces at 450° C. The color was removed. The pieces having specks and pieces of visible foreign material were rejected. The pieces which had some veils or light white clouding were retained and again fluorinated for about 30 hours with elemental fluorine. They were then recrystallized as in Example I and made excellent clear macrocrystals exhibiting very faint light scattering.

Having thus described our invention, what we claim is:

1. A process for the purification of a pre-existing crystalline body of a fluoride of the class consisting of $CaF_2$ and $LiF$, said body exhibiting coloration not characteristic of the pure compound, said process comprising passing elemental fluorine into contact with said body in a solid state for a period of from 2 hours to a week, whereby to remove impurities which form volatile fluorides, and to improve the color thereof.

2. A process for the purification of calcium fluoride which comprises passing elemental fluorine into contact with a pre-existing body thereof in a solid, crystalline state for a period of from 2 hours to a week at a temperature from 200° C. to 1000° C., whereby to remove impurities which form volatile fluorides, and to improve the color thereof.

3. A process for the purification of a pre-existing body of a fluoride of the class consisting of $CaF_2$ and $LiF$ which comprises passing elemental fluorine into contact with said body in a solid, crystalline state at a temperature from 300° C. to 500° C., and thereafter fusing said body of said fluoride and allowing it to recrystallize over a period of from 1 to 10 days while slowly moving it from a region slightly above its melting temperature to a region slightly below such melting temperature.

4. A process for the purification of pre-existing crystalline $CaF_2$, which comprises passing elemental fluorine into contact with a quantity thereof in a solid, crystalline state for at least two hours at a temperature from 200° C. to 1000° C., and thereafter admixing plumbous fluoride with and fusing a body of the so-treated $CaF_2$ and allowing it to recrystallize over a period of from 1 to 10 days.

5. A process which comprises passing elemental fluorine into contact with colored pieces of fluorspar of volume of the order of from 0.002 to 1.0 cubic inch and for a time from 8 hours to a week at a temperature from 200° C. to 1000° C., thereafter selecting colorless pieces free from visible inclusions other than white clouding from the resulting material, fusing them and allowing the resulting melt to recrystallize over a period of from 1 to 10 days.

6. A process which comprises passing elemental fluorine into contact with colored pieces of fluorspar of volume of the order of from 0.002 to 1.0 cubic inch and for a time from 8 hours to a week at a temperature from 200° C. to 1000° C., thereafter selecting therefrom colorless pieces free from inclusions other than white clouding, crushing them to a state of subdivision to pass through a 40 mesh screen, subjecting the so-crushed material to contact with elemental fluorine for at least two hours, fusing the resulting material and allowing the melt to recrystallize over a period from 1 to 10 days.

CARL F. SWINEHART.
MARIE EARLY.

REFERENCES CITED

The following references are of record in the file of this patent:

UNITED STATES PATENTS

| Number | Name | Date |
|---|---|---|
| 2,149,076 | Stockbarger | Feb. 28, 1939 |

OTHER REFERENCES

J. W. Mellor's "Comprehensive Treatise on Inorganic and Theoretical Chemistry," Vd. 2, pp. 13, 514; vol. 3, pp. 688, 714. Longmans Green & Co., N. Y.